3,270,862
CONVEYOR PLATE STRUCTURE
Nathaniel D. Goldberg, 125 N. Racine Ave., Chicago, Ill.
Filed July 10, 1964, Ser. No. 381,867
11 Claims. (Cl. 198—189)

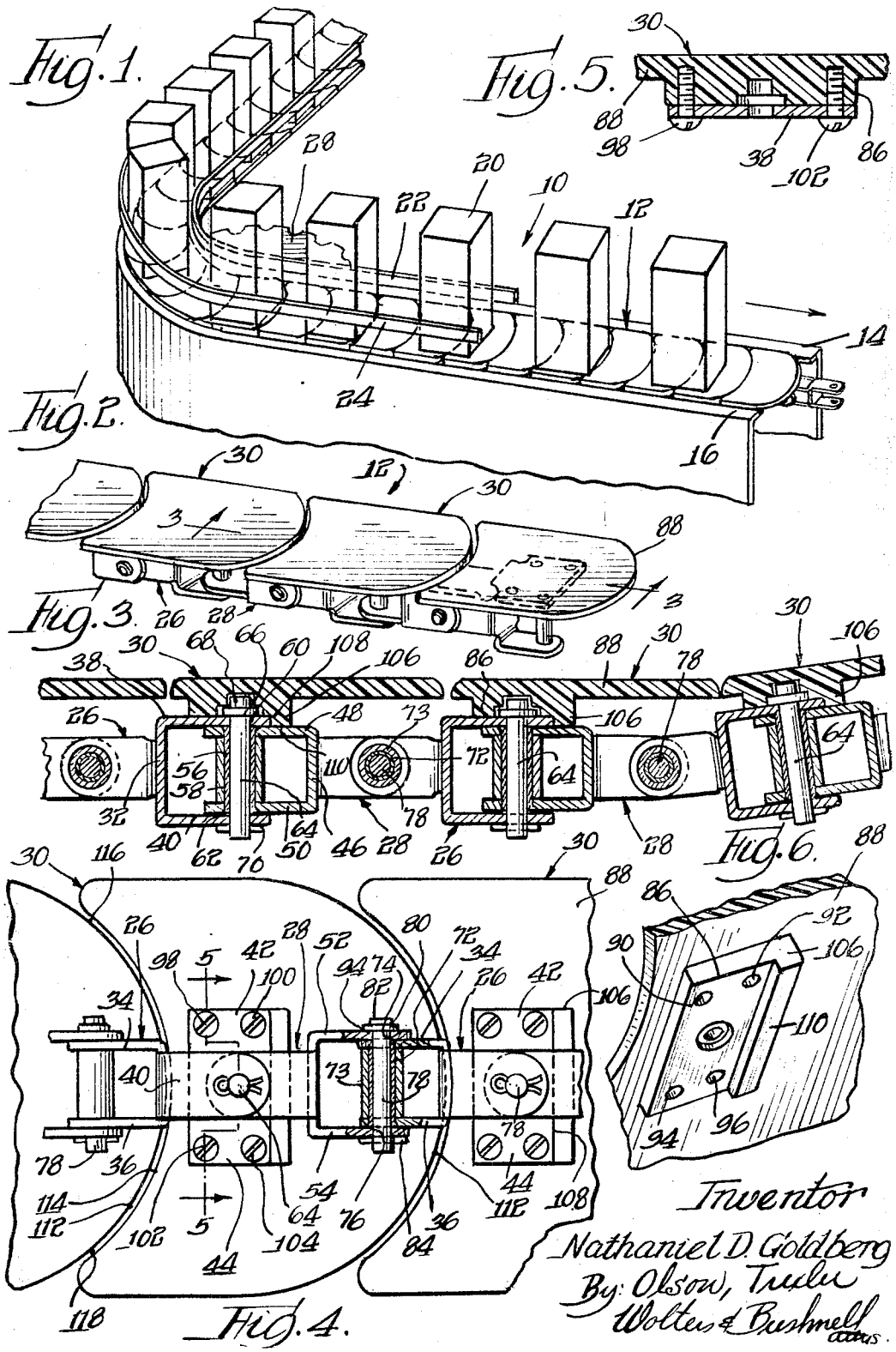

The present invention relates to a novel conveying apparatus, and more specifically to a novel chain type conveyor.

An important object of the present invention is to provide a novel chain type conveyor having chain links and article supporting top plates constructed for facilitating accurate and rapid assembly of parts.

Another important object of the present invention is to provide a novel chain type conveyor having links and top plates constructed for obtaining stronger and more reliable and wear-resisting connections between the top plates and the links.

Still another object of the present invention is to provide a novel conveyor of the above-described type constructed so as to permit turns and so as to reduce friction and wear between adjacent parts.

Other objects and advantages of the present invention will become apparent from the following description and the accompanying drawings wherein:

FIG. 1 is a fragmentary perspective view showing a conveyor structure incorporating features of the present invention;

FIG. 2 is an enlarged fragmentary perspective view showing a chain type conveyor incorporating feature of the present invention;

FIG. 3 is a further enlarged fragmentary sectional view taken generally along line 3—3 in FIG. 2 and showing in addition a relationship between adjacent portions of a conveyor chain when making a change in elevation or, in other words, a turn about a horizontal axis;

FIG. 4 is an enlarged fragmentary bottom view of a portion of the conveyor chain;

FIG. 5 is a fragmentary sectional view taken along line 5—5 in FIG. 4; and

FIG. 6 is a fragmentary bottom perspective view showing a portion of a top plate incorporated in a conveyor of the present invention.

Referring now more specifically to the drawings wherein like parts designated by the same numerals throughout the various figures, a conveyor 10 incorporating features of the present invention is partially shown in FIG. 1. The conveyor 10 comprises an elongated chain structure 12 which will be described in detail below. As will be understood, the chain structure 12 is endless and is adapted to be driven by a suitable motor and drive mechanism, not shown.

The chain structure 12 extends between parallel guide members 14 and 16. These guide members may be straight or may turn a corner extending around a generally vertical axis as shown in FIG. 1 and even may be directed upwardly or downwardly so that a chain turns a corner extending around a generally horizontal axis as indicated in FIG. 3. A sprocket 18 is suitably mounted at the corner of the conveyor structure for guiding the chain. As indicated in FIG. 1, the conveyor is adapted to support a plurality of articles 20 and guide bars 22 and 24 are preferably located along opposite sides of the path of travel of the conveyor and slightly above the conveyor chain for confining the articles 20.

In general, the chain structure 12 comprises a plurality of links 26 and 28 and a plurality of top plates 30. The links are preferably formed from a suitable metal while the top plates are preferably molded from a tough plastic material having anti-friction characteristics.

Each chain link 26 is formed with a central vertically extending base section 32 and a first pair of spaced parallel finger elements 34 and 36 extending from opposite vertical margins of the base section 32. In addition, each link 26 has a second pair of spaced parallel finger elements 38 and 40 extending oppositely from the finger elements 34 and 36 and from upper and lower margins of the base section 32. As shown best in FIG. 4, each upper finger element 32 has opposite laterally projecting extensions 42 and 44 for aiding in securing the links to the top plates in the manner described below.

Each of the links 28 also has a generally vertically disposed base section 46 and a first pair of finger elements 48 and 50 extending from upper and lower margins of the base section 46 and between the finger elements 38 and 40 of an adjacent link 26 as shown best in FIG. 3. Each link 28 also has a second pair of finger elements 52 and 54 extending from opposite sides of vertical margins thereof and embracing the finger elements 34 and 36 of an adjacent link 26 as shown best in FIG. 4.

A tubular bearing or liner 56 is secured between the finger elements 48 and 50 of each link 28 and is surrounded by a tubular spacer 58. The tubular bearing 56 is aligned with apertures 60 and 62 formed in the finger elements 38 and 40 of an adjacent link 26 and the links are pivotally connected by a pin 64 extending through the tubular bearing element 56 and the apertures 60 and 62. A washer 66 secured to the pin 64 adjacent an upper end thereof which upper end 68 is upset and enlarged slightly in order to retain the washer. A cotter pin 70 is assembled in an aperture in a lower end portion of the pivot pin 64.

Another tubular bearing element 72 surrounded by a spacer 73 extends between the finger portions 34 and 36 of each of the links 26 and is aligned with apertures 74 and 76 in the adjacent finger elements 52 and 54 of an adjacent link 28. Another pivot pin 78 extends through the bearing element 72 and the apertures 74 and 76 for securing the finger elements 34–36 and 52–54 together. The pivot pin 78 is identical to the above-described pivot pin 64 and has a washer 80 adjacent one end thereof and secured in position by upsetting or enlarging the end 82 thereof. A cotter pin 84 is assembled in an aperture in the opposite pivot pin 78.

Each of the top plates 30 is formed with a relatively thick central portion 86 and a relatively thin peripheral flange portion 88 extending from an upper margin of the central portion 86. As shown best in FIGS. 3–6, pairs of apertures 90–92 and 94–96 are formed in the central body portion 86 for receiving screws 98–100 and 102–104 extending through aligned apertures and the opposite extending portions 42 and 44 of the finger element 38 of an associated chain link. Preferably the apertures 90–96 are initially unthreaded and the screws are of a self-tapping type so that they are adapted to form complementary threads in the walls of the apertures. It will be observed that the screws have a length similar to but slightly less the overall thickness of the central top plate portion 86 and an associated finger element 38 of a link so as to obtain maximum holding power. More specifically it will be observed that upper ends of the screws project above the lower surfaces of the relatively thin peripheral portion 88 of the top plate.

In order to promote a more accurate and secure and wear resisting connection between each top plate and its associated link, each central relatively thick top plate portion 86 is formed with a depending flange 106 along a leading margin thereof. The flange 106 is adapted firmly to abut a leading edge 108 of an associated link finger element as shown in FIGS. 3 and 4 for positively locating the top plate with respect to the finger element and resisting certain tendencies of the top plate to turn relative to the finger element. In other words, many loads and stresses are transmitted directly between the depending flange 106 and the finger element 38 so that the securing screws are relieved of such loads and stresses. It is further noted that the depending length or height of the flange 106 is slightly greater than the thickness of its associated link finger element 38 whereby the lower face 110 of the flange 106 provides a bearing surface engageable with the upper surface of an adjacent link finger element 48. This structure facilitates relative movement between the parts since, as set forth above, the top plate is formed from a plastic material having anti-friction or bearing characteristics.

Each of the relatively thin peripheral portions 88 of the top plate member has a convex leading edge 112 substantially in the form of a segment of a circle and a concave trailing end or edge 114 complementary to the shape of the leading edge as shown best in FIGS. 2 and 4. The top plate members are mounted on the chain links so that a narrow space or clearance is provided between adjacent leading and trailing edges 112 and 114.

As indicated in the foregoing, the conveyor chain structure is adapted to turn corners both horizontally and vertically. In order to permit relatively abrupt changes in elevation as indicated in FIG. 3, while at the same time maintaining a normal clearance between adjacent ends of the top plate members at a minimum, the end edges 112 and 114 are beveled or rounded as shown best in FIG. 3 substantially from the bottom surfaces of the top plate members to the top surfaces thereof. Furthermore, the fact that the peripheral portions 88 of the top plate members are relatively thin aids in minimizing interference between the top plate members when the conveyor chain moves from one elevation to a higher elevation as indicated in FIG. 3. It may also be observed that the concave trailing edge 114 of each top plate member is adapted to extend around the leading edge 112 of an adjacent top plate member to and preferably slightly past points 116 and 118 indicated in FIG. 4, which points are in a plane containing the axis of an additional pivot pin 78. This construction promotes the provision of a conveyor top surface having a generally uniform width even when a conveyor is turning a corner as shown in FIG. 1.

While a preferred embodiment of the present invention has been shown and described herein, it is obvious that many structural details may be changed without departing from the spirit and scope of the appended claims.

The invention is claimed as follows:

1. In a conveyor structure, a pair of generally parallel spaced apart guide members, a chain including pivotally connected links extending between the guide members, certain of said links including portions presenting an upper surface and a peripheral edge, top plate members respectively associated with said link portions, each of said top plate members including a relatively thick central section disposed on said upper surface of its associated link portions, each of said central sections comprising a depending element abutting said peripheral edge of its associated link portion, and fastening means extending through each of said link portions into its associated thick central section and securing said top plate members to the said links, each of said top plate members including a peripheral portion which is relatively thin as compared with said central portion and which extends from an upper part of said central portion, said peripheral portion overlying and being supported by said guide members.

2. A conveyor structure, as defined in claim 1, wherein said top plate members are formed from anti-friction plastic material, said depending element of said thick central sections being slidably engageable with an adjacent link.

3. A conveyor structure, as defined in claim 1, wherein each of said peripheral portions of said top members comprises an arcuate convex leading edge and an arcuate concave trailing edge, leading and trailing edges of adjacent top plate members being closely spaced apart and being oppositely beveled from adjacent bottom surfaces toward top surfaces of the peripheral portions.

4. In a conveyor structure, a chain including a plurality of pivotally connected links, certain of said links including a generally horizontally extending finger portion presenting an upper surface and a peripheral edge, top plate members respectively associated with said finger portions, each of said top plate members including a relatively thick central section disposed on said upper surface of its associated finger portion, each of said thick central sections comprising a depending flange abutting said peripheral edge of its associated finger portion, each of said top plate members including a peripheral portion which is relatively thin as compared to the central portion and which extends from an upper part of said central portion.

5. A conveyor structure, as defined in claim 4, wherein said peripheral edges of said finger elements are leading edges, and each of said peripheral portions of said top plate members comprises leading and trailing edges, leading edges of the peripheral portions being closely spaced with respect to adjacent trailing edges of adjacent peripheral portions, and adjacent leading and trailing edges of adjacent peripheral portions being oppositely beveled from substantially bottom surfaces of said peripheral portions toward top surfaces thereof.

6. A conveyor structure, as defined in claim 4, wherein said top plate members are formed from anti-friction plastic material, each of said finger elements has a predetermined thickness, and each of said flanges has a depending length at least as great as said thickness.

7. In a conveyor structure having a chain including a link presenting a finger element having an upper surface and a forwardly facing edge, a top plate member adapted to be mounted on said link finger element, said top plate member comprising a relatively thick central section having a bottom surface engageable with said upper surface of the finger element, a flange depending from said central section and being engageable with said forwardly facing peripheral edge of the finger element for locating the central section with respect to the finger element, and a peripheral portion which is relatively thin as compared with said central portion and which extends from an upper part of said central portion, said peripheral portion and said central portion having substantially coplanar upper surfaces, said peripheral portion having a bottom surface disposed in a plane substantially above said bottom surface of the central portion.

8. A top plate member, as defined in claim 7, which includes means defining fastener receiving apertures in said central portion and extending upwardly through said bottom surface of the central portion and to points above said plane containing the bottom surface of said peripheral portion.

9. A top plate member, as defined in claim 8, wherein said peripheral portion comprises convex and concave leading and trailing edges, said leading and trailing edges of the peripheral portion being beveled from adjacent the bottom surface of the peripheral portion toward the top surface thereof.

10. In a conveyor structure, a chain including a plurality of pivotally connected links, a plate member operatively connected to a first surface of a first one of said links, a depending element of said plate operatively engaging a second peripheral surface of said first link, a second link connected to said first link in such a manner that said depending element slidably engages said second link.

11. A conveyor structure as defined in claim 10 wherein said first and second links are engaged by different surfaces of said depending element.

References Cited by the Examiner

UNITED STATES PATENTS

| | | | |
|---|---|---|---|
| 1,424,850 | 8/1922 | Purcell | 198—189 |
| 2,118,348 | 5/1938 | Hoeffleur | 198—189 |
| 2,157,283 | 5/1939 | Dyson | 198—189 X |
| 2,466,240 | 4/1949 | Joa | 198—189 |
| 2,619,843 | 12/1952 | Kampfer | 198—189 X |
| 2,685,361 | 8/1954 | Garman et al. | 198—189 X |
| 2,954,113 | 9/1960 | Hibbard et al. | 198—189 |

EVON C. BLUNK, *Primary Examiner.*

HUGO O. SCHULZ, *Examiner.*

R. E. KRISHER, *Assistant Examiner.*